US008364796B2

(12) United States Patent
Hua et al.

(10) Patent No.: US 8,364,796 B2
(45) Date of Patent: *Jan. 29, 2013

(54) CHANGING ETHERNET MTU SIZE ON DEMAND WITHOUT SHUTTING DOWN THE NETWORK ADAPTOR

(75) Inventors: Binh Hua, Austin, TX (US); Hong L. Hua, Austin, TX (US); Wen Xiong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/449,799

(22) Filed: Apr. 18, 2012

(65) Prior Publication Data

US 2012/0203878 A1  Aug. 9, 2012

Related U.S. Application Data

(63) Continuation of application No. 11/390,787, filed on Mar. 28, 2006, now Pat. No. 8,214,535.

(51) Int. Cl.
*G06F 13/00* (2006.01)
(52) U.S. Cl. .................................................... 709/221
(58) Field of Classification Search .................... 709/250
See application file for complete search history.

(56) References Cited

U.S. PATENT DOCUMENTS

| 5,425,023 | A   | * | 6/1995  | Haraguchi et al. | 370/400 |
| 5,751,970 | A   | * | 5/1998  | Bournas          | 709/236 |
| 6,934,768 | B1  | * | 8/2005  | Block et al.     | 709/248 |
| 2003/0185208 | A1 | * | 10/2003 | Lee et al.      | 370/389 |
| 2006/0221844 | A1 | * | 10/2006 | Subramanian et al. | 370/248 |
| 2006/0253561 | A1 | * | 11/2006 | Holmeide et al. | 709/223 |
| 2007/0115963 | A1 | * | 5/2007  | Vadlakonda et al. | 370/389 |

FOREIGN PATENT DOCUMENTS

EP          1517511 A1  * 3/2005

* cited by examiner

*Primary Examiner* — Robert B Harrell
(74) *Attorney, Agent, or Firm* — Yudell Isidore Ng Russell PLLC

(57) ABSTRACT

A method and system for substantially avoiding loss of data and enabling continuing connection to the application during an MTU size changing operation in an active network computing device. Logic is added to the device driver, which logic provides several enhancements to the MTU size changing operation/process. Among these enhancements are: (1) logic for temporarily pausing the data coming in from the linked partner while changing the MTU size; (2) logic for returning a "device busy" status to higher-protocol transmit requests during the MTU size changing process. This second logic prevents the application from issuing new requests until the busy signal is removed; and (3) logic for enabling resumption of both flows when the MTU size change is completed. With this new logic, the device driver/adapter does not have any transmit and receive packets to process for a short period of time, while the MTU size change is ongoing.

20 Claims, 4 Drawing Sheets

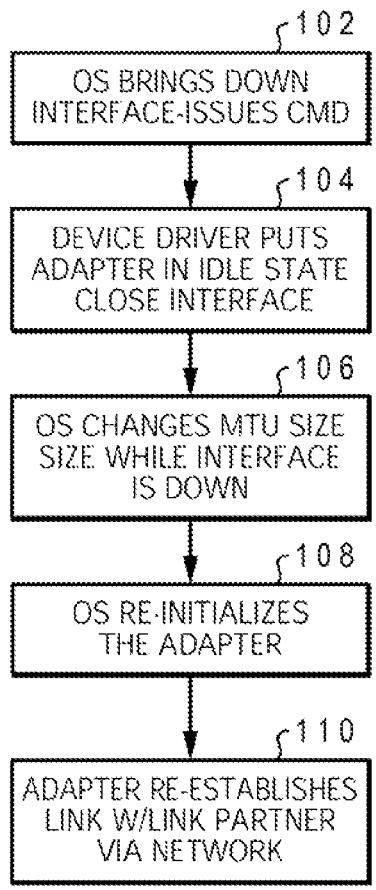
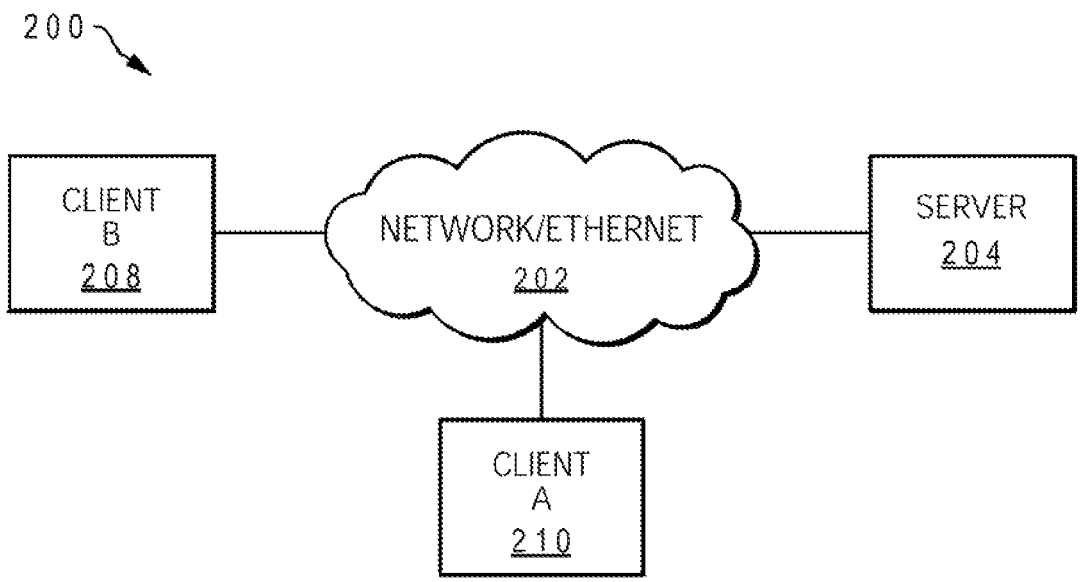
Fig. 1
Fig. 2A

CHANGING ETHERNET MTU SIZE ON DEMAND WITHOUT SHUTTING DOWN THE NETWORK ADAPTOR

PRIORITY CLAIM

The present application is a continuation of and claims priority from U.S. patent application Ser. No. 11/390,787, filed on Mar. 28, 2006, titled "Method For Changing Ethernet MTU Size On Demand With No Data Loss." The content of that application is incorporated by reference herein.

BACKGROUND OF THE INVENTION

1. Technical Field

The present invention relates generally to computer system and more specifically to Maximum Transmission Units (MTUs) of computer systems. Still more particularly, the present invention relates generally to methods for changing the size of an MTU of a computer system.

2. Description of the Related Art

Data communication across computer networks, such as local area networks (LANS) is primarily supported via an Ethernet interface at each network node to which the networked computer system is connected. In conventional Ethernet-based network systems, the network communication (transfer and receipt of network data packets) is enabled by one or more maximum transmission units (MTUs) at the client-Ethernet interface.

MTUs are often of a standard/default size supported throughout the network to handle standard size data transmissions. Oftentimes, however, particularly as network data transmission evolves to include more and more multimedia content of varying size, the size of the MTU have to be adjusted to handle the different sizes of data transmissions. One primary reason for this size adjustment is the allocation of the receive buffer, whose size is based on the MTU size.

With conventional computer systems, when the MTU size has to be changed, most operating systems (OSes) require the Ethernet interface to be brought down before the size changing operation is undertaken. The driver places the adapter hardware in an idle state and resets the adapter before the driver changes the receive buffer size to prevent the adapter from DMAing any new data to the receive buffer during the size changing operation.

FIG. 1 illustrates the process of changing the MTU size according to conventional methods. As shown, the process begins at block 102 at which the OS first brings down the Ethernet interface (using the command "ifconfig down" for example). When the command is issued, the device driver puts the adapter in an idle state by closing the interface and resetting the adapter, as provided at block 104. When this occurs, the link between the adapter and link partner (e.g., the switch port/other Ethernet adapter across the network) is lost. Following, the OS changes the interface's MTU size (using the command "ifconfig XXXX up MTU 9000", for example), as indicated at block 106. Then, the OS re-initializes the adapter as depicted at block 108. The adapter then re-establishes the link with the link partner as provided at block 110.

With conventional systems, the first step (102) typically brings down all/any applications using the interface, as well as the interface. Thus, any data pending on the application and data on the way from network (e.g., from a link partner) will be either dropped or lost. Because of this loss of data during the shut down of the interface with conventional methods, changing the MTU size is very cumbersome in a running environment.

Recent developments with MTU size changing operations include an enhancement for some OSes, which involves combining two commands into a single command (e.g., "ifconfig XXXX mtu 9000"). However, this "single" command is actually two operations being issued concurrently (and being completed in an overlapping time frame). The execution of this "single command" still requires the OS bring down the interface/adapter before the size change and then bring up the interface/adapter with a different MTU size after the change is completed. This method may, however, enable the application to remain connected after the MTU size changes. However, while this method offers some improvement over previous, conventional methods, there still remains the likelihood of potential packet loss during the time the interface/adapter is down.

SUMMARY OF THE INVENTION

Disclosed is a method and system for substantially avoiding loss of data and enabling continuing connection to application during an Maximum Transmission Unit (MTU) size changing operation in an active network computing device. Logic is added to the device driver, which logic provides several enhancements to the MTU size changing operation/process. Among these enhancements are: (1) logic for temporarily pausing the data coming in from the linked partner while changing the MTU size. In one embodiment, this logic utilizes IEEE 802.3x Flow Control standard and applies to the packets being generated at the link partner and/or coming from the network; (2) logic for returning a "device busy" status to higher-protocol transmit requests during the MTU size changing process. This second logic prevents the application from issuing new requests until the busy signal is removed; and (3) logic for enabling resumption of both flows when the MTU size change is completed. With this new logic, the device driver/adapter does not have any transmit and receive packets to process for a short period of time, while the MTU size change is ongoing. It is therefore safe to reinitialize the transmit buffers and receive buffers to match the new MTU size, without having to account for any lost packets during the change.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 1 is a flow chart of the prior art process of completing conventional MTU size changes;

FIG. 2A is a computer network within which various features of the invention may be implemented, as described in one embodiment of the invention;

DETAILED DESCRIPTION OF AN ILLUSTRATIVE EMBODIMENT

Figure 2B:
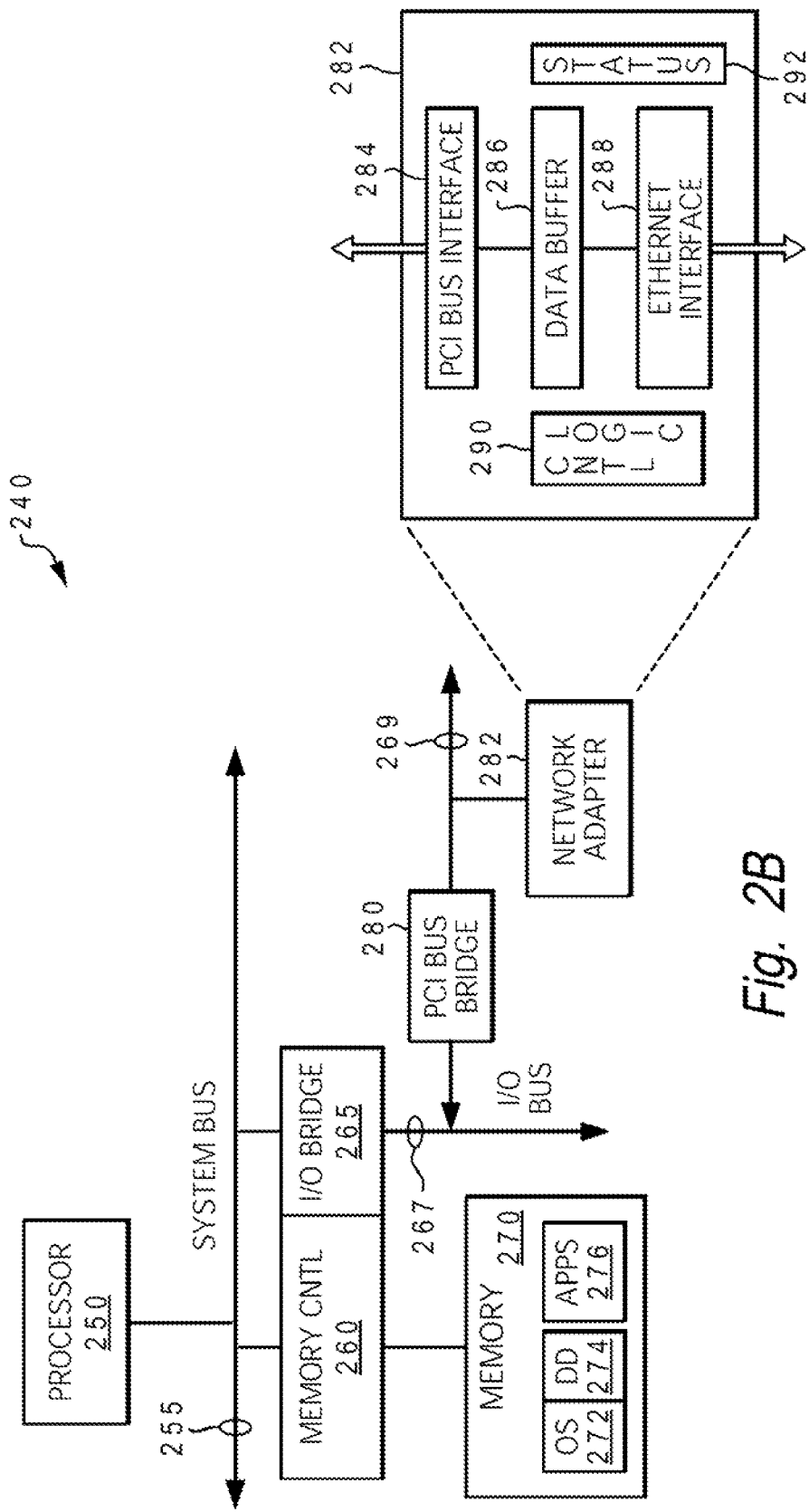
FIG. 2B is an example data processing system with a network adapter and device drivers and other functional components utilized to provide the various features of the invention, according to one embodiment.

The present invention provides a method, system and computer program product for substantially avoiding loss of data and enabling continuing connection to application during an Maximum Transmission Unit (MTU) size changing operation in an active network computing device. Unlike with conventional methods, the disclosed method does not bring the interface down and does not reset the adapter. Logic is added to the device driver, which logic provides several enhancements to the MTU size changing operation/process. Among these enhancements are: (1) logic for temporarily pausing the data coming in from the linked partner while changing the MTU size. In one embodiment, this logic utilizes IEEE 802.3x Flow Control standard and applies to the packets being generated at the link partner and/or coming from the network; (2) logic for returning a "device busy" status to higher-protocol transmit requests during the MTU size changing process. This second logic prevents the application from issuing new requests until the busy signal is removed; and (3) logic for enabling resumption of both flows when the MTU size change is completed. With this new logic, the device driver/adapter does not have any transmit and receive packets to process for a short period of time, while the MTU size change is ongoing. It is therefore safe to reinitialize the transmit buffers and receive buffers to match the new MTU size, without having to account for any lost packets during the change.

With reference now to the figures, FIG. 2A depicts a representation of a network of data processing systems (Network system 200) in which the present invention may be implemented. Network system 200 contains network 202 (also referred to as a network backbone/infrastructure or network link), which is the medium utilized to provide communication links between various devices and computers connected together within network system 200. Network link 202 may include connections, such as wire, wireless communication links, or fiber optic cables.

In the depicted illustration, network system 200 comprises server 204 and multiple clients 208 and 210, interconnected via network link 202. Clients 208 and 210 may be, for example, personal computers or network computers. Also, in the described embodiment, network system 200 is a local area network (LAN) or similar Ethernet-based network (e.g., intranet). FIG. 2A is intended as an example, and does not imply any architectural limitation on the type of network referenced within the description of the invention.

Referring now to FIG. 2B, there is depicted a block diagram representation of a data processing system, which (as an example) is assumed to be client A 210 of FIG. 2A, in accordance with the illustrative embodiment. Data processing system 240 comprises processor 250 coupled to memory controller 260 and input/output (I/O) bridge 265 via system bus 255. Memory controller 260 provides connectivity to and controls access to memory 270. I/O bridge 265 likewise provides the connectivity to and/or control over input/output devices, via I/O bus 267.

In the illustrative embodiment, the data processing system 240 employs a peripheral component interconnect (PCI) local bus architecture, with one or more PCI busses (e.g., PCI bus 269) coupled to I/O bus 267. Processor 250 and main memory 270 are connected to PCI local bus 269 through PCI bridge 280. Adapters of I/O devices connect to PCI local bus 269 via direct connection or via add-in boards inserted into expansion slots (not shown). In the illustrative embodiment, network adapter 282 is connected to PCI local bus 269 by direct component connection.

Network adapter 282 of data processing system 240 is a network interface device that is utilized to connect data processing system 240 to another computer system and/or computer network (as illustrated by FIG. 2A). Network adapter 282 provides interconnectivity to an external network through a gateway or router, or other such device within the network link 202. In one embodiment, network adapter 282 may be an Ethernet card that enables connection of data processing system 240 to an Ethernet-based network, such as network link 202.

FIG. 2B also provides an example layout of internal components of network adapter 282. As shown, network adapter comprises Ethernet interface 288, data buffer 286, and PCI bus interface 284. These three components provide a path between the network 202 and PCI bus 269 of the data processing system 240. Ethernet interface 288 provides an interface to the network 202 connected to the data processing system 240. PCI bus interface 284 provides an interface to a bus, such as PCI bus 269. Data buffer 286 is used to store data being transmitted and received through network adapter 282. This data buffer may also includes a connection to an SRAM interface (not shown) to provide for additional storage. Status register 292 provides a place to store information used to configure and run processes on network adapter 282. For example, status register 292 may be utilized to store the "busy" status of the adapter 282 when the MTU size change is being performed. Controller logic 290 controls the different processes and functions performed by network adapter 282. Control logic 290 may be a processor or an application-specific integrated chip (ASIC). Of course, network adapter 282 may also include other components that are not specifically shown, such as an electrically erasable programmable read-only memory (EEPROM) interface. The illustrative embodiment is provided solely for illustration and to aid in the description of the invention.

Located within memory 270 are a number of software components of which operating system (OS) 272, associated device drivers 274, and software applications 276 are illustrated. Device drivers 274 and software applications 133 may also include Ethernet-supported network access applications/utilities and network browser programs, among others. OS 272 runs on processor 250 and is used to coordinate and provide control of various components within data processing system 240. The OS 272 may be a commercially available operating system such as Windows XP®, (a trademark of Microsoft Corporation and which is available from Microsoft Corporation) or GNU®/Linux® (registered trademarks of the Free Software Foundation and The Linux Mark Institute).

In one embodiment, additional (new) logic is added to the device driver 274 in addition to the normal device driver functional logic. This new logic provides the above functional features whenever an MTU size change operation is triggered. That is, the new logic operates to (1) continually send out IEEE 802.3x Flow Control pause frames to the network and (2) return "device busy" status to higher protocol transmit requests during the MTU size changing process, among other functions.

When executed by the processor, the OS 272 enables the functionality by which the device driver 272 supports communication (exchange of packets) between the applications 276 executing in the "higher application layer" and other devices across the network 202. According to the illustrative embodiment, OS 272, applications 2763, and enhanced device driver 274 execute (on processor 250) to provide/enable the MTU size change operations (described below with reference to FIGS. 3-4) without requiring a shut down of the application or the adapter associated with the network packet exchange.

Those of ordinary skill in the art will appreciate that the hardware depicted in FIG. 2B may vary. For example, other peripheral devices, such as optical disk drives and the like, also may be used in addition to or in place of the hardware depicted. Thus, the depicted example is not meant to imply architectural limitations with respect to the present invention.

In the illustrative embodiment, the hardware components of data processing system 240 are of conventional design. It will therefore be appreciated that the system described herein is illustrative and that variations and modifications are possible. Thus, while the invention is describe as being implemented in data processing system 240, those skilled in the art appreciate that various different configurations of data processing systems exists and that the features of the invention are applicable regardless of the actual configuration of the data processing system 240. For example, the processes of the present invention may be applied to a multiprocessor data processing system. The data processing system depicted in FIG. 2B may be, for example, an IBM eServer pSeries system, a product of International Business Machines Corporation in Armonk, N.Y., running the Advanced Interactive Executive (AIX) operating system or LINUX operating system. Further, the invention is applicable to not only a desktop/laptop computer system but may also be implemented in a portable and/or hand held device such as a personal digital assistant (PDA), cell phone, or other hand-held devices, as well as within larger mainframe type devices.

Figure 3:
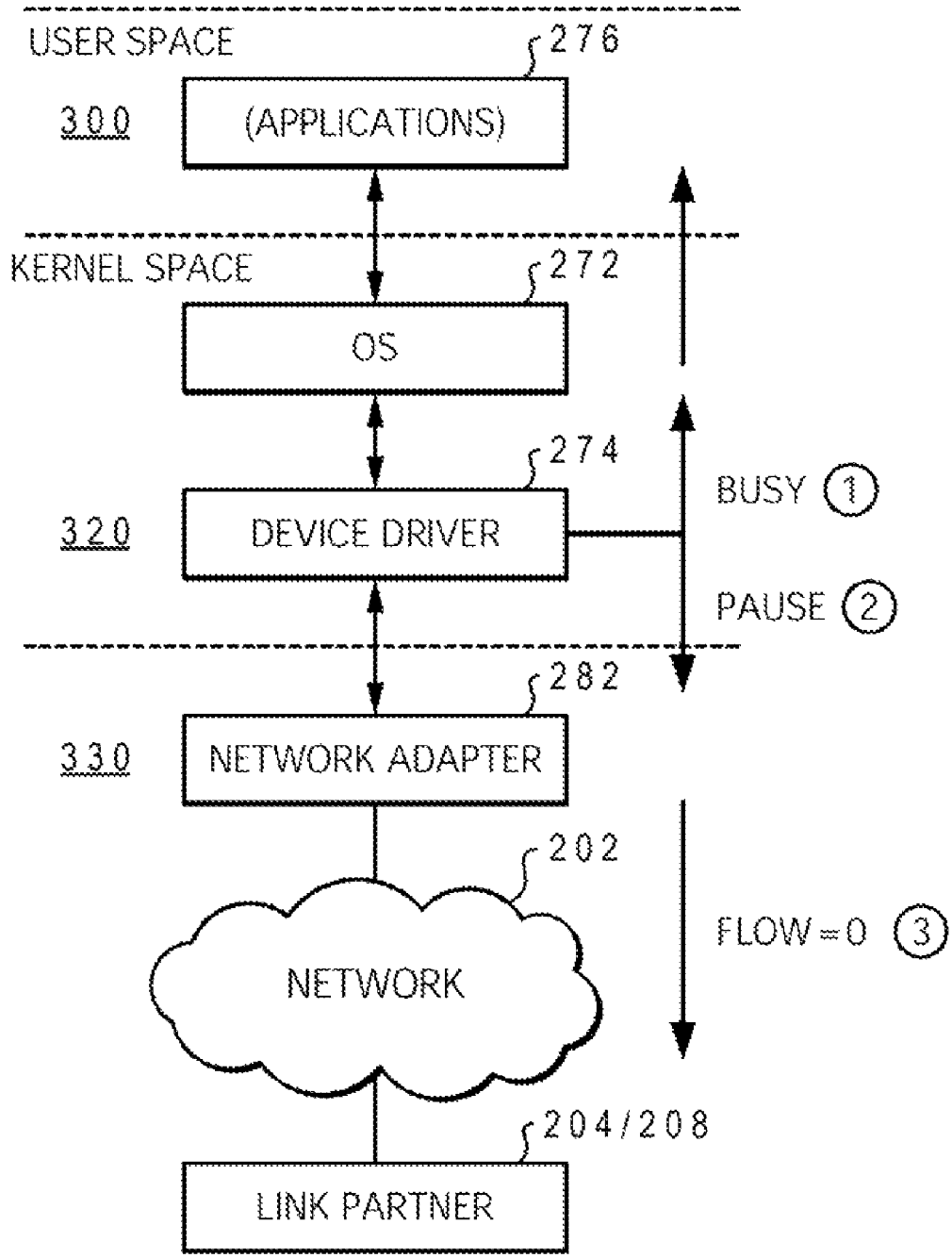
FIG. 3 is an extrapolated view of the interaction between software layers of the data processing system of FIG. 2B and the network-level hardware layers at which the MTU size change occurs according to one embodiment of the invention.

FIG. 3 provides a layered view of the interaction between software layers of data processing system 240 and the hardware layers/devices that support network communication. Three layers are provided, with the first two being software layers, namely user space 300 and kernel space 320, while the last layer is a hardware layer 330. User space 300 comprises applications 276 which execute on the processor 250 and provide/receive data packets that are transmitted via the network 202 to a link partner 204/208. Kernel space 320 comprises OS 272 and device drivers 274. Hardware layer 330 comprises network adapter 282, which is controlled by device driver 274. Network adapter 282 enables communication with link partner 204/208 (i.e., client B or server) via network link 202.

During a link session with link partner 204/208, data packets travel from "higher layer" user space 300 to network adapter 282 and are issued to the network link 202. Also, network data packets are received from network link 202 by network adapter 282, which ultimately passes the data packets up to the higher layer (user space 300). In some situations, the data packets are passed to the kernel space. Within the figure, circled numbers, 1, 2, 3, indicate the three types of operations that are enabled by the new logic added to device driver 274 to support an MTU size change. The particular operations (or signals) are busy, pause, and flow control, and are issued from device driver 274 during MTU size change according to the process illustrated by FIG. 4, which is described below.

Figure 4:
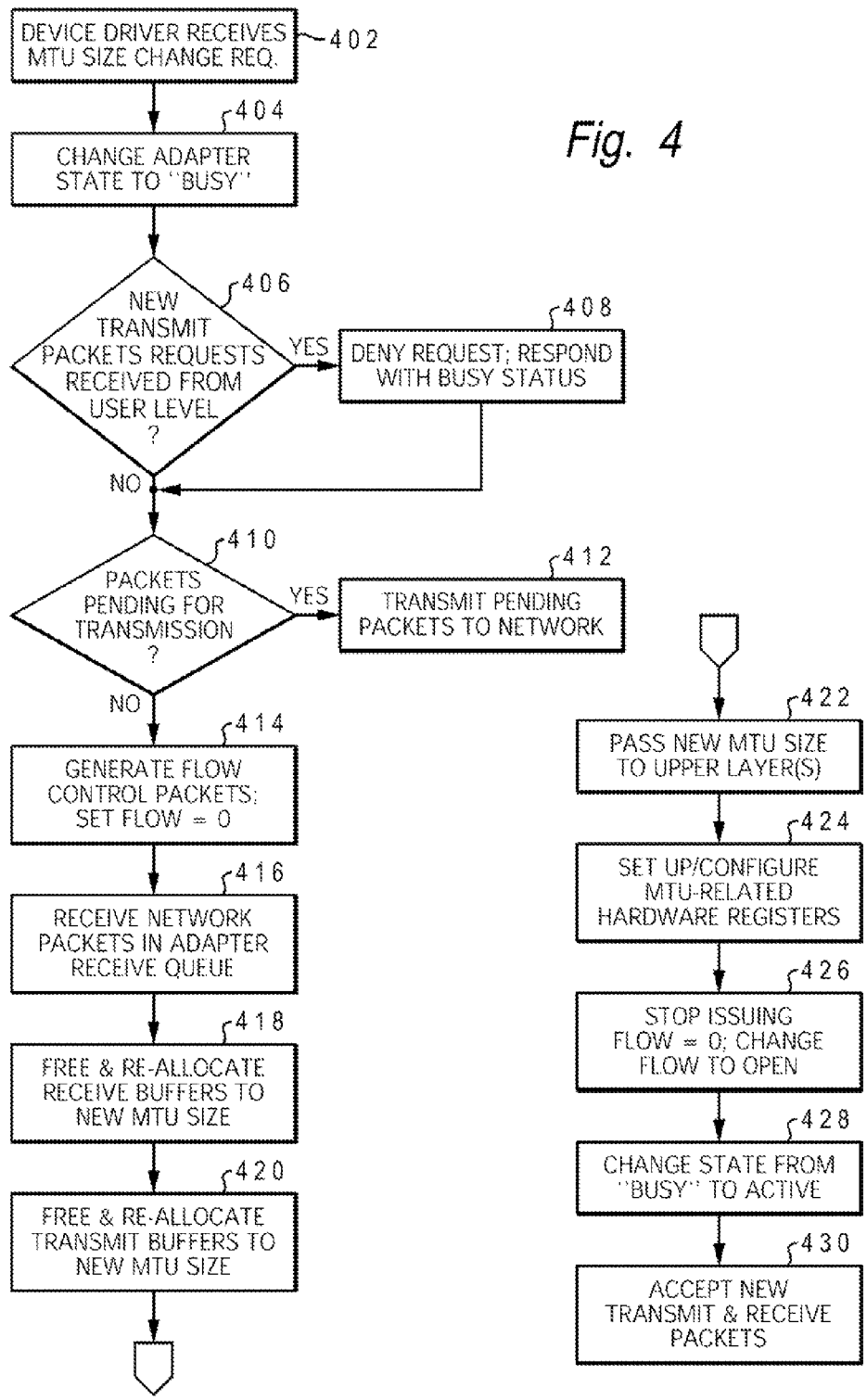
FIG. 4 is a flow chart of the process by which the MTU exchange is completed without packet data loss according to one embodiment of the invention.

FIG. 4 illustrates the process by which the methods of the invention are implemented utilizing the hardware and software components and configurations thereof, illustrated within FIGS. 2B and 3. The process begins at block 402, which illustrates that the device driver receives a MTU change command/request. In response to the receipt of the change command, the device driver 274 changes the device (adapter) state from open (active) to busy, as indicated at block 404. While the adapter 282 is in this busy state, the device driver 274 checks at decision block 406 whether any transmit packet requests are received from the higher layer 300, and the device driver 274 responds to any transmit packet request from the higher layer 300 with a busy status, as shown at bock 408. The device driver 272 also checks at decision block 410 whether there are any transmit-pending packets. If there are any transmit-pending packets at the adapter 282, the device driver 274 sends the transmit-pending packets into the network 202, as depicted at block 412.

Concurrently, the device driver 274 starts generating and issuing control packets to the network port flow (at block 414) to prevent any additional packets coming from the link partner 204/208 (over the network 202). In one embodiment, the device driver 274 completes this process by setting the low water mark register of flow control to zero (0).

Following this, the device driver 274 receives all pending packets in the adapter receive queue at block 416, and forwards these packets to the higher layer 300. Then, the driver 274 frees and re-allocates all receive buffers based on the new MTU size requested, as depicted at block 418. At block 420, the driver 274 also frees and re-allocates all transmit buffers based on the new MTU size, as needed. Since the network layer maintains the MTU size, the device driver 274 passes the new MTU size to the upper layer, as indicated at block 422. The device driver 274 also sets-up MTU-related hardware registers, such as payload registers and receive frame registers, as shown at block 424.

Once the above processes are completed, the device driver 274 enables the link partner to resume sending packets by stopping the generation of the zero flow control at block 426. In one embodiment, this re-start is triggered/accomplished by setting the low water mark flow control register back to a non-zero percent (e.g., 80%) of the hardware's receive FIFO size. Finally, at block 428, the device driver 274 changes the device state from busy back to active, and at block 430 the driver 274 starts accepting new transmit requests from the higher layer 300 and received packets from the network link.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of device or media used to actually carry out the distribution. Examples of the types of device or media include recordable type storage device media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. In a data processing system, a method comprising:
 receiving a request to change a size of a Maximum Transmission Unit (MTU) utilized with network-level communication, wherein the request is received during an ongoing session between a network adapter and a link partner; and dynamically completing the change of the size of the MTU to a new size by: setting an operating state of the adapter to a busy state that is communicated to a higher layer space from which transmit packets are generated; generating and issuing control packets to a network port flow to prevent additional packets coming from the link partner; and completing the change in the size of the MTU while the operating state is set to the busy state and the control packets are being issued to the network port flow, wherein the change in the size of the MTU occurs without shutting down the network adapter.

2. The method of claim 1, further comprising:
providing the busy state in response to requests for transmission received from higher layer components, wherein said requests are denied while said network adapter is in said busy state; and
forwarding previously received data packets from the higher layer components out to a network link connecting the network adapter to an external network in order to complete the change in the size of the MTU without incurring any loss of transmit data packets already received at the adapter from the higher layer components.

3. The method of claim 1, wherein setting an operating state of the adapter to a busy state comprises setting a status register that stores information used to configure and run processes on the network adapter.

4. The method of claim 1, further comprising:
setting a receive state of the network adapter to pause; and
automatically forwarding to respective higher layer components any data packets received from an external network for each respective higher layer component in order to complete the change in the size of the MTU without incurring any loss of receive data packets already received at the adapter from the external network.

5. The method of claim 1, further comprising:
setting a low water mark register of flow control substantially equal to zero;
generating a flow control message with a value of the low water mark register of flow control set substantially equal to zero (0); and
issuing the flow control message out to a network link and to the link partner, wherein the flow control message with the value substantially equal to zero causes the link partner to not issue any more data packets addressed to the network adapter until the link partner receives a subsequent flow control message with a value that is higher than and not substantially equal to zero.

6. The method of claim 1, wherein said completing the change of the size of the MTU, further comprises:
freeing and re-allocating all receive buffers based on the new MTU size requested;
freeing and re-allocating all transmit buffers based on the new MTU size;
forwarding the new MTU size to higher-layer components; and
setting-up MTU-related hardware registers, including payload registers and receive frame registers.

7. The method of claim 1, wherein in response to completion of the MTU size change, the method further comprises:
changing an operating state of the network adapter from a busy state back to an active state;
generating a new flow control message with a non-zero value; and
issuing the new flow control message with the non-zero value to a network link and the link partner, wherein the link partner is pre-programmed to resume issuing data packets addressed to the network adapter in response to the link partner receiving a flow control message with the non-zero value.

8. A data processing system comprising:
an application layer comprising one or more applications that generate and consume data packets for network communication;
a network adapter that provides a network communication interface to a link partner on an external network;
an operating system (OS) that supports interactions between the application layer and the network adapter; and
a device driver associated with the OS that supports operations of the network adapter, said device driver comprising logic that causes the network adapter to:
receive a request to change a size of a Maximum Transmission Unit (MTU) utilized with network-level communication, wherein the request is received during an ongoing session between a network adapter and a link partner; and
dynamically complete the change of the size of the MTU to a new size by: setting an operating state of the adapter to a busy state that is communicated to a higher layer space from which transmit packets are generated; generating and issuing control packets to a network port flow to prevent additional packets coming from the link partner; and completing the change in the size of the MTU while the operating state is set to the busy state and the control packets are being issued to the network port flow, wherein the change in the size of the MTU occurs without shutting down the network adapter.

9. The data processing system of claim 8, said device driver further comprising logic that causes the network adapter to:
provide the busy state in response to requests for transmission received from higher layer components, wherein said requests are denied while said network adapter is in said busy state; and
forward previously received data packets from the higher layer components out to a network link connecting the network adapter to an external network in order to complete the change in the size of the MTU without incurring any loss of transmit data packets already received at the adapter from the higher layer components.

10. The data processing system of claim 8, further comprising a status register that stores information used to configure and run processes on the network adapter and wherein the logic that sets the operating state of the adapter to a busy state comprises logic for setting the status register to a value that indicates the network adapter is busy.

11. The data processing system of claim 8, said device driver further comprising logic that causes the network adapter to:
set a receive state of the network adapter to pause; and
automatically forward to respective higher layer components any data packets received from an external network for each respective higher layer component in order to complete the change in the size of the MTU without incurring any loss of receive data packets already received at the adapter from the external network.

12. The data processing system of claim 8, said device driver further comprising logic that causes the network adapter to:
set a low water mark register of flow control substantially equal to zero;

generate a flow control message with a value of the low water mark register of flow control set substantially equal to zero (0); and issue the flow control message out to a network link and to the link partner, wherein the flow control message with the value substantially equal to zero causes the link partner to not issue any more data packets addressed to the network adapter until the link partner receives a subsequent flow control message with a value that is higher than and not substantially equal to zero.

13. The data processing system of claim 8, wherein said logic that causes the network adapter to complete the change of the size of the MTU, further comprises logic that causes the network adapter to:

free and re-allocate all receive buffers based on the new MTU size requested;

free and re-allocate all transmit buffers based on the new MTU size;

forward the new MTU size to higher-layer components; and set-up MTU-related hardware registers, including payload registers and receive frame registers.

14. The data processing system of claim 8, wherein in response to completing the MTU size change, the device driver further comprises logic that causes the network adapter to:

change an operating state of the network adapter from a busy state back to an active state;

generate a new flow control message with a non-zero value; and issue the new flow control message with the non-zero value to a network link and the link partner, wherein the link partner is pre-programmed to resume issuing data packets addressed to the adapter when the link partner receives a flow control message with the non-zero value.

15. A computer program product comprising:

a computer readable storage device; and program code on said computer readable storage device that when executed within a data processing system having a network adapter enables the data processing system to perform the functions of:

receiving a request to change a size of a Maximum Transmission Unit (MTU) utilized with network-level communication, wherein the request is received during an ongoing session between a network adapter and a link partner; and dynamically completing the change of the size of the MTU to a new size by: setting an operating state of the adapter to a busy state that is communicated to a higher layer space from which transmit packets are generated; generating and issuing control packets to a network port flow to prevent additional packets coming from the link partner; and completing the change in the size of the MTU while the operating state is set to the busy state and the control packets are being issued to the network port flow, wherein the change in the size of the MTU occurs without shutting down the network adapter.

16. The computer program product of claim 15, said program code further comprising code for:

providing the busy state in response to requests for transmission received from higher layer components, wherein said requests are denied while said network adapter is in said busy state; and forwarding previously received data packets from the higher layer components out to a network link connecting the network adapter to an external network in order to complete the change in the size of the MTU without incurring any loss of transmit data packets already received at the adapter from the higher layer components.

17. The computer program product of claim 15, said program code further comprising code for:

setting a receive state of the network adapter to pause; and automatically forwarding to respective higher layer components any data packets received from an external network for each respective higher layer component in order to complete the change in the size of the MTU without incurring any loss of receive data packets already received at the adapter from the external network.

18. The computer program product of claim 15, said program code further comprising code for:

generating a flow control message with a value of a low water mark register of flow control set substantially equal to zero (0); and issuing the flow control message out to a network link and to the link partner, wherein the flow control message with the value substantially equal to zero causes the link partner to not issue any more data packets addressed to the network adapter until the link partner receives a subsequent flow control message with a value that is higher than and not substantially equal to zero.

19. The computer program product of claim 15, wherein said program code for completing the change of the size of the MTU, further comprises code for:

freeing and re-allocating all receive buffers based on the new MTU size requested;

freeing and re-allocating all transmit buffers based on the new MTU size;

forwarding the new MTU size to higher-layer components; and setting-up MTU-related hardware registers, including payload registers and receive frame registers.

20. The computer program product of claim 15, wherein in response to completion of the MTU size change, the program code further comprises code for:

changing an operating state of the adapter from a busy state back to an active state;

generating a new flow control message with a non-zero value; and issuing the new flow control message with the non-zero value to a network link and the link partner, wherein the link partner is pre-programmed to resume issuing data packets addressed to the adapter when the link partner receives a flow control message with the non-zero value.

* * * * *